No. 817,736. PATENTED APR. 10, 1906.
L. DAFT & A. WILLIAMS.
APPARATUS FOR DETECTING AND LOCALIZING MINERAL DEPOSITS.
APPLICATION FILED OCT. 14, 1902.
2 SHEETS—SHEET 2.
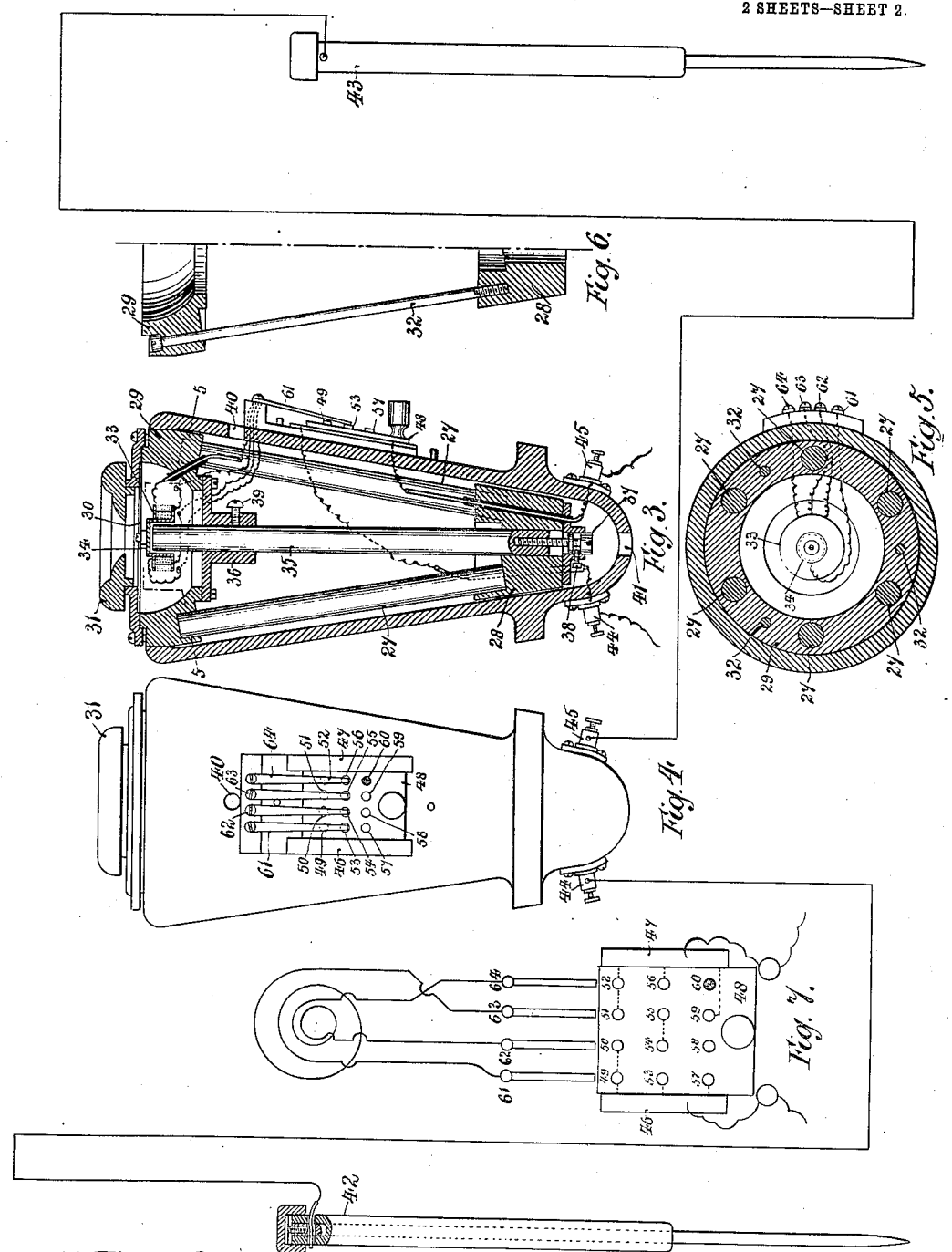
WITNESSES
INVENTORS
Leo Daft  Alfred Williams
ATTORNEYS

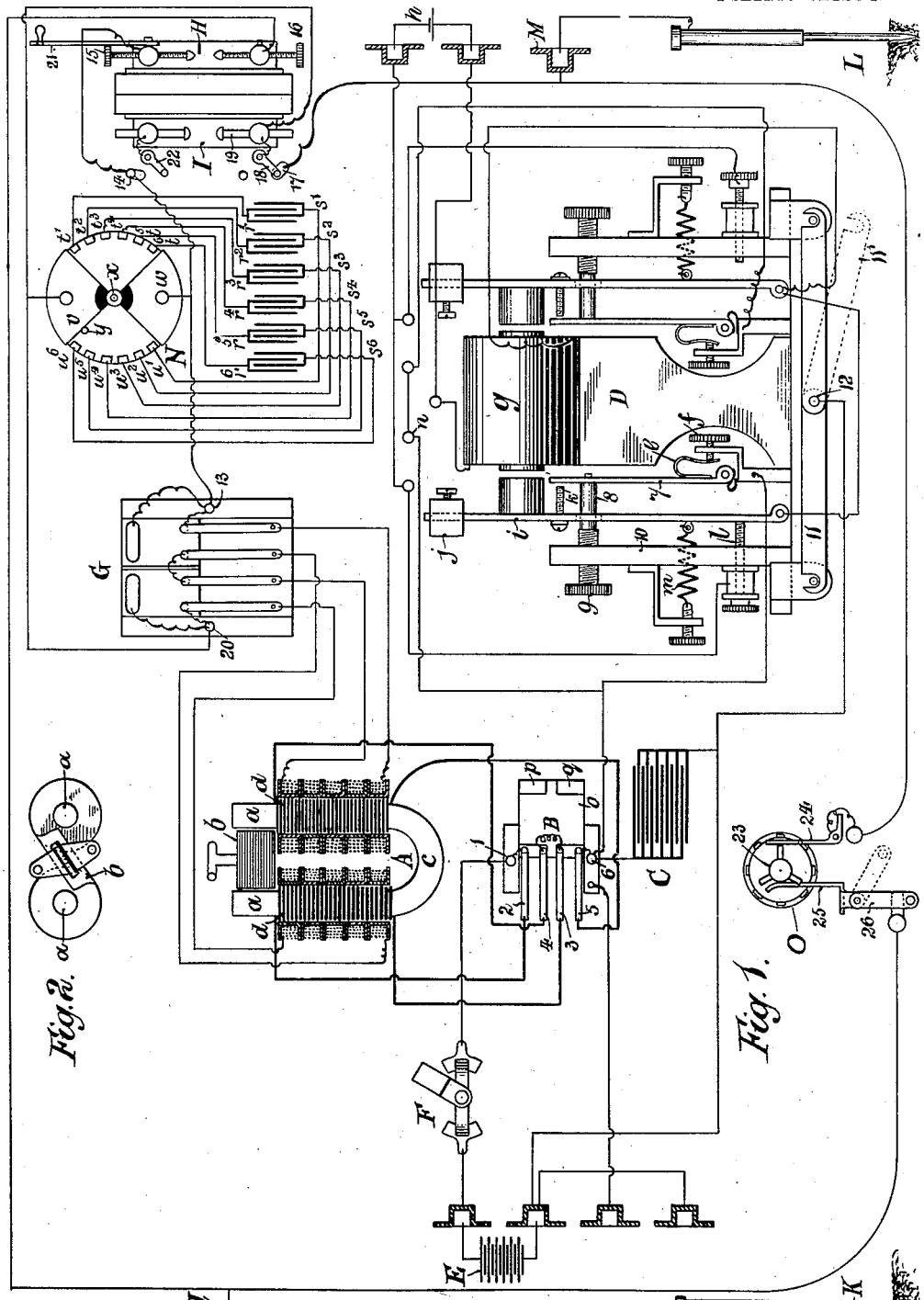

UNITED STATES PATENT OFFICE.

LEO DAFT, OF EALING, AND ALFRED WILLIAMS, OF WIMBLEDON, ENGLAND, ASSIGNORS TO THE ELECTRICAL ORE FINDING COMPANY LIMITED, OF LONDON, ENGLAND.

APPARATUS FOR DETECTING AND LOCALIZING MINERAL DEPOSITS.

No. 817,736.      Specification of Letters Patent.      Patented April 10, 1906.

Application filed October 14, 1902. Serial No. 127,251.

*To all whom it may concern:*

Be it known that we, LEO DAFT, of The Laboratory, Meadow House, The Mall, Ealing, in the county of Middlesex, and ALFRED WILLIAMS, of No. 10 Princes road, Wimbledon, in the county of Surrey, England, have invented a certain new and useful Improved Apparatus for Detecting and Localizing Mineral Deposits; and we do hereby declare the following to be a full, clear, and exact description of the invention, such as will enable others skilled in the art to which it appertains to make and use the same.

This invention relates to the use of apparatus which is adapted to produce from any convenient source of electricity electric impulses of a very abrupt character and to project these impulses through the crust of the earth into far-extending regions and other apparatus which is adapted to detect the presence of those impulses at a considerable distance and to differentiate the character of their manifestations as affected by the nature of the underlying material in the immediate neighborhood, with the object that by the use of the combined apparatus the position and the boundaries of an underlying mineral deposit may be determined.

The apparatus consists of, first, an inductor wherewith electric impulses are generated in a secondary circuit on the interruption of a primary circuit; second, a resonator or receiving instrument adapted to be tuned to respond readily to feeble electric impulses, and, third, electrodes which are adapted to facilitate the making of an earth contact and to be joined by wire conductors—two to the inductor and two to the resonator.

The method of observation adopted is as follows: Two electrodes are planted in the soil at about the center of the district which it is desired to explore, the distance apart being anything between, say, five and one hundred yards, depending on circumstances. The inductor before mentioned is joined up to those electrodes, with the result that lines of impulses are established in the neighboring underlying soil, which lines in the case of homogeneous soil have directions like those of the lines of magnetic force due to a magnet which has its poles at the electrodes. In proceeding along any one line of impulse there will be a steady fall of potential from the positive to the negative electrode. The line of steepest gradient of the potential will be the straight line from electrode to electrode; but on each side of that line and in the earth beneath there will be curved lines of falling potential somewhat of the shape of an ellipse having an axis along the line joining the electrodes.

With our apparatus we have distinguished these lines of impulses as far away from the inductor-electrodes as four miles, and accordingly they must extend downward below the surface of the earth to a similar distance.

For the purpose of explaining how by these manifestations we are able to locate the position of a mineral deposit we will commence by stating that we aim at placing our electrodes in such a situation that the lines of impulses before mentioned cross the area of the deposit transversely. We will assume that such a situation has been discovered and adopted and will describe the nature of the observations which follow.

One of the electrodes connected to the resonator is planted in the soil at some considerable distance from the inductor-electrodes, and the operator carrying the other electrode proceeds from the first electrode along the line of impulse and touches the soil at intervals, at the same time listening at the resonator. If he is proceeding toward the mineral deposit, the sounds will gradually become more intense. He then moves his first electrode in the same direction and seeks to bridge the mineral deposit with the resonator connecting-wire and to plant the two electrodes one on each side of the deposit, but outside its limits. Supposing that done, he will find that the sound will grow in intensity as the electrodes are caused to approach the margins of the deposit and that when the electrodes step over the margin into the soil overlying the deposit there will be an abrupt falling off of the sound and that when both electrodes are well within the boundary there will be comparative silence. These phenomena may be explained by observing that the lines of electric impulses will be concentrated toward a medium of superior conductivity, and that medium will be the principal conducting-channel of the stream of impulses from one side to the other. If the mineral deposit extended to the surface, (in which case our method of discovery would be unnecessary,) the electrodes would dip into the stream and the manifestation would be great; but if there is overlying material of a non-conductive character, as in the case assumed, the electrodes will be more or less entirely insulated from the current of impulses which will be coursing through the conducting-mineral material below and the resonator will be more or less silent.

Much judgment and experience will be requisite to enable an operator in an entirely unknown field to reach the desired goal quickly; but the above description will indicate the nature of the operation which should be followed. Having determined the transverse limits of the deposit, the longitudinal are sought by planting the inductor-electrodes in a line at right angles to the former line and repeating the observations; but a more effective and rapid plan is to simultaneously use two inductors and two pairs of electrodes, which are placed at right angles to one another. The two inductors are tuned to produce distinctly different notes and the operator accustoms himself to pay attention to one only at a time. Of course any number of operators with resonators may be exploring the district at the same time, the excitement for all being produced by the single or the duplex pair of inductor-electrodes.

In order to obtain reliable results under a large variety of conditions as to the general conductivity of the soil and the special conductivity of the portion which is sought, we require our inducting apparatus to be capable of emitting impulses which have a wide variety in respect to the factors energy, potential, frequency, and abruptness of fluctuation. Hence there are many parts, all of which are called into requisition at one time or another.

One of the important features on which the success of the operations with our instruments depends is the exceeding abruptness of fluctuation of the impulses, which we are able to achieve by superposing two or more causes of fluctuation one on the other by placing them in series or by placing them in parallel.

Often a considerable amount of electrical energy has to be transmitted. This when concentrated by great abruptness of action is liable to damage the instrument. Safety appliances are therefore introduced, such as a fuse and a maximum safety sparking gap. Also it is advantageous to have an ammeter in the circuit. These contrivances are in the interests of simplicity omitted from the drawings, which show the apparatus whereby we carry out our process.

Referring to the drawings, which form a portion of the specification, Figure 1 is a diagrammatic representation of the inductor, its fittings, and its leads. Fig. 2 is a plan view of the armature and poles of the inductor-electromagnet; and Figs. 3 to 7 are various views of the resonator, its electrodes, and wire connections.

The core of the inductor A is composed of a bundle of soft-iron wire which is bent into the form of an elongated U. The arms of the U extend beyond the bobbins which carry the wire circuits and form the pole-pieces $a$ $a$. Between them is pivoted an armature $b$, which is composed of many layers of soft transformer-iron of greater sectional area than the core. The ends of the armature are shaped so that when the gap between the poles is bridged as fully as possible the armature will be in contact with the poles over as large an extent of surface as possible. (See Fig. 2.) Sufficient friction is provided at the pivots to retain the armature in position, with any desired width of air-gap between its ends and the poles of the magnet. The combined length of the pole-pieces, together with the armature which is adopted, is equal to that of the joining-arc $c$ at the lower end of the magnet for the purpose of balancing the magnetic circuit when the air-gap is closed.

The ends of the coils $d$ $d$ of the primary wire are led to a switch B, which is so constructed that the two primary coils may either be placed in series with one another or in parallel, as may be desired. In the drawings they are shown in series. The primary circuit is also associated with the condenser C.

The interruption of the primary circuit is effected by an independent duplex break D, the electromagnet of which is energized by an independent circuit from a source of electricity. The primary current may be taken through the two breaks in parallel or in series, as desired, or one break alone may be used. In the drawings the connections shown effect the passage in parallel.

The path of the primary current with the connections, as shown, is as follows: Starting from a source of electricity, which is represented by a battery E, the current flows through the switch F to a binding-post 1, which is in contact with the strip 2 of the switch B. From this it goes to the upper end of the left-hand primary coil, then from the lower end of that coil to the strip 3 of the switch B. This and the adjacent strip 4 rest on studs which are electrically united, whereby the current proceeds to the upper end of the right-hand coil and emerging at the lower end, which is joined up to the strip 5, the current gets to the adjoining binding-post 6. From the binding-post 6 the current is led through the break D in parallel.

This apparatus is symmetrically arranged in duplicate on each side of a central plane. The course through one side only will be traced, the other being precisely similar, as will be clear from the drawings. A wire from the binding-post 6 conducts the current to a vibrating arm 7, which carries a contact-rod 8. By means of a spring $e$, the tension of which can be adjusted by the screw $f$, the contact-rod 8 is pressed against the fixed but adjustable contact 9. In this way the current is conducted down the standard 10 to the strip 11 and from the binding-post 12 back to the source of electricity E, being on the way joined up to one element of the condenser C, the other element being connected to the binding-post 6. The break in this primary occurs by the severance of the contacts 8 and 9, which is effected in the following manner: An electromagnet $g$ on being energized by a source of electricity $h$ attracts its pivoted armature $i$, which armature carries a weight $j$ adjustable in position. When in obedience to the attraction the weighted armature has acquired a considerable velocity, the end of a projecting rod $k$, which is secured to it, strikes the pivoted arm 7 and very abruptly breaks the contact of the ends of 8 and 9. Further movement of the armature $i$ causes it to break contact with the fixed but adjustable contact-screw $l$, and so severs the connection with the source of electricity $h$, which permits the magnet $g$ to become deënergized. The armature $i$ will now return by the pull of a spring $m$, and the contact of 8 and 9 will be resumed; so, also, will the contact of the armature with $l$, causing the magnet to be again energized, and so on repeatedly. One of the chief merits of this contrivance is that the contacts 8 and 9 remain together for a considerable fraction of the period of vibration, which fraction is capable of adjustment to suit the degree of saturation which is desired. Also the duplication of the breaking-points enables a greater degree of uniformity of action to be maintained for a length of time. A further important effect is derivable from our duplex break by adjusting the weights $j$. They may be adjusted so that the period of vibration is the same for both and unison of break obtained, or any desired degree of discordance may be introduced. The superposition of these discordant breaks, either in parallel or in series, will greatly assist in producing the far-traveling and attention-calling impulses which are requisite for attaining our object.

It is not necessary to use both contact-screws $l$ at the same time to energize the magnet $g$. One of them is withdrawn far enough to be out of action and ready as a reserve.

If it is desired to use one break only, then one of the strips 11 is withdrawn, as shown in dotted lines 11' on the right-hand side. If, on the other hand, it is desired to send the current through both breaks in series instead of in parallel, the wire connection from the binding-post 6 to the post $n$ is removed and the terminal wire back to E is disconnected from the post 12 and joined up to the post $n$.

Returning now to the switch B, we will describe how, by means of it, the two coils $d$ $d$ of the electromagnet A are traversed in parallel instead of in series. On a slide $o$ are mounted two plates $p$ and $q$, as well as four studs. In the position shown the studs are underneath the ends of the spring-strips 2 3 4 5 and in contact with them, and the current flows along the strips in the order as above described; but if the slide $o$ is moved to the left the plates $p$ and $q$ are brought underneath the ends of the strips 2 3 4 5 and in contact with them, the contact with the studs being broken. The plate $p$ will also be connected with the binding-post 1 and the plate $q$ with the post 6. Under these circumstances the primary current will enter the plate $p$ and divide, flowing in parallel along the strips 2 and 4 and down through the coils $d$ and $d$, and so to the plate $q$, where the two halves rejoin and proceed to the break, as before described. So much for the primary circuit.

The secondary wire is wound in sections which are separated from one another by transverse planes. This wire is connected up to a series-parallel switch G of the same construction as B, the position of the slide shown in the drawings being such as to cause the circuit to be in series through the two secondary coils of the magnet A. The lead of the secondary may readily be traced to the two binding-posts 13 on the right hand and 20 on the left. A wire joins the post 13 to a post 14 on a sparking-gap apparatus, in which two pairs of alternative sparking points are provided. The pair H, which have somewhat sharp points, are shown in operation, the other pair I being switched off. The secondary current traverses a wire to the screw 15 of one sparking point and leaping the gap arrives at the screw 16 of the other point, from which it gets to the plug J, to which the electrode K is connected. In this way the current gets to earth and after traversing it enters the second electrode L, which is connected to the other plug M. From M the connection is made to a stud 17, and when the switch 18 is in the position shown the current passes to one of the blunt-ended screws 19 of the sparking gap I and thence to the binding-post 20 on the series-parallel switch G, thus completing the circuit.

When it is desired to obtain a more intense effect by requiring the current to leap the blunt-ended gap I, the switch 21 is employed to bridge the gap between 15 and 16. Also the switch 22 is turned into contact with the plate of the binding-post 14, which permits the circuit to be completed in an alternative manner, but in parallel with the earth instead of being in series, as when the sparking gap H is used. Branch leads from the flow and return wires of the secondary are joined to binding-screws, which are secured to the two elements of a condenser N. This is shown as consisting of six distinct divisions each of two elements, so arranged that only one or any number up to six may be brought into parallel, thus providing six different grades of capacity for the condenser easily adjustable at will.

The six elements destined to be connected to one lead of the secondary are named $r'$, $r^2$, to $r^6$, the opposite elements being $s'$, $s^2$, to $s^6$. Six pairs of studs $t'$ $u'$, $t^2$ $u^2$, to $t^6$ $u^6$ are affixed to an insulated disk at opposite ends of a diameter and occupy two opposite quadrants of that disk. The stud $t^3$, for example, is electrically connected to the element $r^3$ of the condenser and the opposite stud $u^3$ to the corresponding opposite condenser element $s^3$ and the others correspondingly. A pair of opposite quadrants $v$ $w$, made in one piece, but insulated from one another, are mounted on a central pin $x$, and the two leads of the secondary are joined, respectively, to $v$ and $w$. By turning the quadrants $v$ $w$ clockwise from the position shown $v$ will cover and connect one or more of the studs $t$, and $w$ a corresponding number of the studs $u$, and thus bring into parallel action the like number of divisions of the condenser. $y$ is a stop against which the quadrant $v$ butts when the entire condenser is out of action.

The inductor apparatus is fitted with still another device O for multiplying the frequency of the impulses. It consists of a star-wheel 23, which is shown as having three projecting spurs, though the number may be greater or less. This is revolved at a high speed by an electromotor from a source of electricity. (Not shown on the diagram.) A plate 24 is presented opposite to the ends of the spurs with more or less approximation capable of adjustment. This plate is connected to the plug M of the secondary wire, and a brush 25, which is maintained in spring-contact with the spindle of the star-wheel 23, is connected to the plug J. In this way the star-wheel connection is placed in parallel with the earth connection of the electrodes K L when desired and may be disconnected by placing the switch 26 in the dotted position.

The resonator is a kind of telephone which is so constructed that the tympanum is exposed to an unusually strong magnetic field, with the object of enabling it to respond to very feeble electric impulses and give audible indications of their existence.

The construction is shown in Figs. 3 to 7, in which Fig. 3 is a section. Fig. 4 is an outside view of the resonator, its electrodes, and the wire connections. Fig. 5 is a section taken through the dotted line 5 5 of Fig. 3. Fig. 6 is a section showing one of the longitudinal connecting-screws, and Fig. 7 is a diagrammatic view of the coils and switch connections. In one or more of these figures are shown six bar-magnets 27 27, symmetrically situated, having their axes divergent upward as if on lines on an inverted-cone surface. These have their lower ends immersed in a soft-iron pole-piece 28 and their upper ends in a soft-iron pole-piece 29, which is hollowed.

The edge of a tympanum 30 is secured between the rim of the hollow in the pole-piece 29 and a mouthpiece 31, 29 and 31 being fastened together by a number of screws. Three long screws 32 32 keep the pole-pieces and magnets together. Depending from the center of the tympanum is a bobbin 33, the groove of which contains two separate coils of fine wire, one wound outside the other. The connection between the tympanum and the bobbin is effected by a soft-iron disk 34, which fits tightly or is screwed into the upper end of the central cavity of the bobbin, a small screw being used to connect the tympanum and disk 34 and a small washer being inserted between the two latter to give freedom for vibration to the tympanum. The central actuating-magnet 35 fits into a hole drilled in the pole-piece 28 and is held in an accurately central position by passing through a brass support 36, secured by screws to the upper pole-piece 29. The cavity of the bobbin is made sufficiently large in diameter to clear the end of the magnet 35 and allow the bobbin to vibrate freely with the tympanum.

In order to adjust the distance between the ends of the magnet 35 and the disk 34, a screw 37 is provided. This has a groove formed in its head, into which the point of a screw 38 is inserted. The longitudinal movement of the screw 37 being thus prevented, a movement of the magnet will be effected by the rotation of the screw. The set-screw 39 is tightened sufficiently to prevent the magnet from turning during the longitudinal adjustment and then tightened still more to secure it firmly when it is adjusted. There are holes 40 and 41 in the wood case for the insertion of a screw-driver to operate the screws 37 and 39. In addition to this method of adjusting the sensitiveness of the resonator a switch is provided, whereby the two coils on the bobbin can at will be placed either in parallel or in series or one of them cut out of the circuit. For this purpose the leads from the electrodes 42 and 43, which are joined, respectively, to the binding-posts 44 and 45, are connected to the side plates 46 and 47, respectively, of the switch. A slide 48 carries three sets of studs, which are numbered 49 to 52, 53 to 56, 57 to 60, respectively, and there are four spring-plates 61 to 64. The two ends of the inside wire coil are joined to the plates 62 and 64, respectively, those of the outer wire being connected to the plates 61 and 63. The plate 46 is connected to the studs 49, 50, 53, and 57, the plate 47 being joined to 51, 52, 56, and 59. The stud 60 is made of insulating material.

When the studs 49 to 52 are under the ends of the spring-plates, the two coils will be in parallel. On shifting the slide so that the studs 53 to 56 take the place of the former studs the two coils will be in series, and a further shift of the slide will cause the inner coil to be cut out of the circuit.

The electrode 42 consists of a metal rod incased at its upper end in insulating material. A hole is drilled longitudinally at the upper end to receive a screw 61, the head of which is insulated. There is also a transverse hole 62, through which the connecting-wire is threaded, the wire being secured by the screw 61. The other electrodes are similarly constructed.

In addition to the variations in inductance of the secondary coil, which are provided for by means of the series-parallel switch G, it is evident that it is capable of wide variation as to capacity by means of the switch N, which places its external terminals or condensers in series, in parallel, or singly, as the operator may find suitable to accord with local conditions.

The double circuit-break when used in parallel produces a discordant effect, which is easily detected in the telephone as distinct from the discharge due to single break. This is desirable on the ground of its greater enduring qualities due to the double platinum contacts.

The function of the spark-gap is an indispensable one for our long-distance exploring work apart from the question of oscillation. The effect of introducing the spark-gap even without tuning is to greatly enlarge the area which can be explored from one earthing. For instance, with a coil using sixty-watts energy in the primary and (E 12 C 5) and with a ratio of fifteen to one and primary condenser of 1.5 motive force capacity with earthings two hundred feet apart the limit of audition with telephone earthings also two hundred feet apart was found to be about six hundred yards in ordinary moist earth. Under exactly the same conditions the introduction of a secondary condenser of about .001 motive force capacity (adjustable over a range of .0005 to .002 motive force) increased the observable range to about twelve hundred yards, quadrupling the area. The figures are of course unimportant and are merely illustrative.

Regarding the character of the spark it is a matter of common experience in laboratory work to find the discharge across a spark gap becoming unidirectional at nearly the limit of sparking distance for the potential and capacity employed, and it is at this point of what has been named "tuning" that we find the effect not only much more effective in exploration, but also infinitely more sensitive to the proximity of mineral deposits.

The term "tuning" as used in the specification is intended only to mean that the frequency of break in the two coils when used as described is dissimilar, so as to enable the operator to distinguish them during exploration. The function of the elements 23, 24, 25, and 26 is to produce a break in the secondary circuit discordant with the frequency produced by the primary break and consists, as above stated, of a small motor 23 with three or more platinum arms projecting from the shaft and engaging the adjustable arm 24, either in actual contact or at such distance as the operator may wish, thus forming a secondary and auxiliary spark-gap which is occasionally found useful in very dry earth. It is evident that the circuit is completed through the rubbing contact-spring 25 and the switch 26.

In order to avoid the effects of merely surface conduction, due to condenser discharges of small capacity, and therefore of high frequency, in many cases we preferably employ the previously-described adjustments of condensers and secondary circuits to conform with Kelvin's law of obtaining unidirectional impulses, and so cause the discharges to be more diffused and capable of indicating mineral deposits at considerable depth, which would otherwise escape detection.

We claim—

1. An apparatus for locating mineral deposits consisting of a combination of a source of electricity, an inductor which is adapted to emit fluctuating electric impulses, two portable electrodes which are electrically connected, having the battery and inductor in series between them, two other portable electrodes which are electrically connected and a resonator which is in series between them, such resonator being adapted to produce audible sensations from electric impulses.

2. An apparatus for locating mineral deposits consisting of a combination of a source of electricity, an inductor consisting of the following parts namely, an electromagnet, doubly wound, the primary circuit of which is adapted to be traversed by the electricity from the above-mentioned source, a break for the primary circuit, a condenser having each of its two elements joined to the primary circuit with the break between the connections, two portable electrodes which are electrically connected, having the source of electricity and inductor in series between them, two other portable electrodes which are electrically connected and a resonator which is in series between them, such resonator consisting of a telephone-receiver to produce audible sensations from electric impulses.

3. An apparatus for locating mineral deposits consisting of a combination of a source of electricity, an inductor consisting of the following parts namely, an electromagnet, doubly wound, the primary circuit of which is adapted to be traversed by the electricity from the above-mentioned source, a break for the primary circuit, a condenser having each of its two elements joined to the primary circuit with the break between the connections, a sparking gap on the secondary circuit, a condenser having each of its two elements joined to the secondary circuit with the sparking gap between the connections, two portable electrodes which are electrically connected, having the source of electricity and inductor in series between them, two other portable electrodes which are electrically connected and a resonator which is in series between them, such resonator being adapted to produce audible sensations from electric impulses.

4. An apparatus for locating mineral deposits consisting of a source of electricity, an electromagnet, doubly wound, the primary circuit of which is adapted to be traversed by the electricity from the above-mentioned source, a break for the primary circuit, a sparking gap for the secondary circuit, a condenser for the secondary adapted to be graded in capacity, and two portable electrodes adapted to make earth contact, and a resonator and two other portable electrodes in series therewith, substantially as described.

5. An apparatus for locating mineral deposits consisting of a source of electricity, an electromagnet, doubly wound, the primary circuit of which is adapted to be traversed by the electricity from the above-mentioned source, an adjustable armature which is adapted to vary the air-gap of the poles of the magnet, a switch which is adapted to place the two primary coils in series or in parallel as desired, a duplicate break for the primary circuit independently operated by an electromagnet and armature, the two breaking-contacts of which are adapted to be placed in series or in parallel and adapted to be synchronous or discordant in their breaking, a condenser for the primary circuit, a second switch which is adapted to place the two secondary coils in series or in parallel as desired, a sparking gap for the secondary circuit, a condenser for the secondary circuit adapted to be graded in capacity, a motor-driven high-frequency break for the secondary, and two portable electrodes adapted to make earth contact and a resonator and two other portable electrodes in series therewith, substantially as described.

6. An apparatus for locating mineral deposits consisting of a source of electricity, an inductor which is adapted to emit fluctuating impulses, the secondary of said inductor being adjustable as to inductance and capacity, a condenser adjustable as to capacity, two portable electrodes which are electrically connected, having the battery and inductor in series between them, two other portable electrodes which are electrically connected and a telephone-receiver which is in series between them, substantially as described.

7. An apparatus for locating mineral deposits consisting of a source of electricity, an inductor which is adapted to emit fluctuating impulses, the secondary of said inductor being adjustable as to inductance and capacity, a condenser adjustable as to capacity, two portable electrodes which are electrically connected, having the battery and inductor in series between them, two other portable electrodes which are electrically connected and a telephone-receiver which is in series between them, said telephone-receiver being adjustable to accord with the adjustments of the other parts of the apparatus, substantially as described.

In testimony that we claim the foregoing as our invention we have signed our names in the presence of two subscribing witnesses.

LEO DAFT.
ALFRED WILLIAMS.

Witnesses:
T. A. H. CARSON,
WALTER J. SKERTEN.